(12) United States Patent
Baraev et al.

(10) Patent No.: US 9,781,071 B2
(45) Date of Patent: Oct. 3, 2017

(54) METHOD, APPARATUS AND COMPUTER PROGRAM PRODUCT FOR PROVIDING AUTOMATIC DELIVERY OF INFORMATION TO A TERMINAL

(75) Inventors: Ilya Baraev, Tampere (FI); Hannu Sakari Mettälä, Lapinkylä (FI); Timo Pakkala, Espoo (FI); Timo K. Miettinen, Tuusula (FI)

(73) Assignee: Nokia Technologies Oy, Espoo (FI)

( * ) Notice: Subject to any disclaimer, the term of this patent is extended or adjusted under 35 U.S.C. 154(b) by 1570 days.

(21) Appl. No.: 11/427,176

(22) Filed: Jun. 28, 2006

(65) Prior Publication Data

US 2008/0005263 A1    Jan. 3, 2008

(51) Int. Cl.
  *H04L 29/12*    (2006.01)
  *H04L 29/08*    (2006.01)

(52) U.S. Cl.
  CPC .... *H04L 61/1547* (2013.01); *H04L 29/12122* (2013.01); *H04L 67/26* (2013.01); *H04L 67/2823* (2013.01); *H04L 67/04* (2013.01); *H04L 67/36* (2013.01)

(58) Field of Classification Search
  CPC .......... H04L 61/1547; H04L 29/12122; H04L 67/26; H04L 67/04; H04L 67/36
  USPC ................................ 709/223, 217
  See application file for complete search history.

(56) References Cited

U.S. PATENT DOCUMENTS

| | | | | |
|---|---|---|---|---|
| 5,920,253 | A * | 7/1999 | Laine | H04B 3/54 340/12.33 |
| 6,026,430 | A * | 2/2000 | Butman et al. | 709/203 |
| 6,038,601 | A * | 3/2000 | Lambert et al. | 709/226 |
| 6,247,060 | B1 * | 6/2001 | Boucher | G06F 5/10 709/230 |
| 6,304,907 | B1 * | 10/2001 | Keronen | G06F 17/30873 707/E17.111 |
| 6,567,854 | B1 * | 5/2003 | Olshansky | G06Q 30/02 705/14.46 |
| 6,671,757 | B1 * | 12/2003 | Cash | H04L 67/1095 707/999.201 |

(Continued)

FOREIGN PATENT DOCUMENTS

| | | | | |
|---|---|---|---|---|
| CN | 101809605 A | * | 8/2010 | .......... H04L 12/581 |
| EP | 1 788 786 | | 5/2007 | |

(Continued)

OTHER PUBLICATIONS

Merriam-Webster, "retrieve", 2015.*

(Continued)

*Primary Examiner* — O. C. Vostal
(74) *Attorney, Agent, or Firm* — Alston & Bird LLP

(57) ABSTRACT

An apparatus for providing automatic delivery of information to a terminal includes a communication element, a registry element and a proxy element. The communication element is configured to receive information corresponding to new content associated with a particular service. The registry element is configured to retrieve an identifier of an publisher associated with the particular service in response to receipt of the information. The proxy element is configured to push an indication of the new content to a receiving terminal having the identifier in a contact list of the receiving terminal in response to receipt of the information.

20 Claims, 8 Drawing Sheets

(56) References Cited

U.S. PATENT DOCUMENTS

| | | | | |
|---|---|---|---|---|
| 6,704,295 B1* | 3/2004 | Tari | H04L 12/1859 | 370/270 |
| 6,766,163 B1* | 7/2004 | Sharma | H04L 29/06 | 348/435.1 |
| 6,968,179 B1* | 11/2005 | De Vries | H04L 12/5895 | 455/414.1 |
| 6,973,299 B2* | 12/2005 | Apfel | H04M 1/274516 | 379/266.1 |
| 7,024,491 B1* | 4/2006 | Hanmann | G06F 17/30575 | 455/412.1 |
| 7,056,217 B1* | 6/2006 | Pelkey | A63F 13/12 | 463/25 |
| 7,076,554 B1* | 7/2006 | Kobayashi | H04M 7/0057 | 370/352 |
| 7,130,895 B2* | 10/2006 | Zintel et al. | 709/220 | |
| 7,248,861 B2* | 7/2007 | Lazaridis | G06Q 30/00 | 455/412.1 |
| 7,506,355 B2* | 3/2009 | Ludvig et al. | 725/112 | |
| 7,523,165 B2* | 4/2009 | Gourraud | H04L 29/06 | 709/203 |
| 7,627,608 B2* | 12/2009 | Strandell | G06Q 10/107 | |
| 7,668,123 B1* | 2/2010 | Scott | H04W 64/00 | 370/310 |
| 7,788,382 B1* | 8/2010 | Jones | H04L 67/1095 | 709/227 |
| 7,788,399 B2* | 8/2010 | Brouk | G06Q 10/10 | 370/216 |
| 7,853,703 B1* | 12/2010 | McBarron | G06Q 10/00 | 455/412.1 |
| 7,941,752 B2* | 5/2011 | Ozugur | H04L 63/102 | 379/90.01 |
| 7,979,870 B1* | 7/2011 | Pulsipher | G06F 13/00 | 709/201 |
| 8,065,383 B2* | 11/2011 | Carlson et al. | 709/217 | |
| 8,085,741 B2* | 12/2011 | Kiss | H04L 29/125 | 370/338 |
| 8,099,511 B1* | 1/2012 | Ganesan | H04N 21/2225 | 709/231 |
| 8,112,537 B2* | 2/2012 | Guenther | H04L 67/1095 | 709/203 |
| 8,209,437 B2* | 6/2012 | Henders | G06F 17/30581 | 709/203 |
| 8,255,482 B2* | 8/2012 | McColgan | G06Q 10/10 | 455/414.1 |
| 8,274,935 B2* | 9/2012 | Gidron | H04L 12/5895 | 370/329 |
| 8,311,887 B2* | 11/2012 | Tsou | G06Q 30/02 | 705/14.57 |
| 8,452,852 B2* | 5/2013 | Jachner | H04L 29/06027 | 709/206 |
| 8,621,025 B2* | 12/2013 | Ridgard | H04L 67/1095 | 709/206 |
| 8,701,017 B2* | 4/2014 | Ozugur | H04L 67/24 | 709/227 |
| 8,935,384 B2* | 1/2015 | Goldschlag | H04W 4/00 | 709/217 |
| 2002/0073208 A1* | 6/2002 | Wilcock | H04L 12/1818 | 709/227 |
| 2002/0075304 A1* | 6/2002 | Thompson | G06F 3/0481 | 715/751 |
| 2002/0077076 A1* | 6/2002 | Suryanarayana | G06Q 20/32 | 455/406 |
| 2002/0083035 A1* | 6/2002 | Pearl | G06F 17/30861 | |
| 2002/0085568 A1* | 7/2002 | Oommen | H04L 41/046 | 370/401 |
| 2002/0087643 A1* | 7/2002 | Parsons | G06F 9/542 | 709/206 |
| 2002/0090934 A1* | 7/2002 | Mitchelmore | H04L 29/06 | 455/412.2 |
| 2002/0160805 A1* | 10/2002 | Laitinen | H04L 29/06 | 455/550.1 |
| 2002/0184089 A1* | 12/2002 | Tsou | G06Q 30/02 | 705/14.41 |
| 2003/0018714 A1* | 1/2003 | Mikhailov et al. | 709/203 | |
| 2003/0084109 A1* | 5/2003 | Balluff | G06F 3/0481 | 709/206 |
| 2003/0093476 A1* | 5/2003 | Syed | H04L 12/1836 | 709/204 |
| 2003/0188001 A1* | 10/2003 | Eisenberg | H04L 29/06 | 709/229 |
| 2003/0220866 A1* | 11/2003 | Pisaris-Henderson et al. | | 705/37 |
| 2004/0024846 A1* | 2/2004 | Randall | H04L 67/04 | 709/219 |
| 2004/0121761 A1* | 6/2004 | Tripathy | H04M 1/7255 | 455/413 |
| 2004/0125136 A1* | 7/2004 | Wallenius | G06F 17/3087 | 715/764 |
| 2004/0192364 A1* | 9/2004 | Ranalli | H04L 29/12066 | 455/517 |
| 2004/0254993 A1* | 12/2004 | Mamas | H04L 12/5895 | 709/206 |
| 2005/0060266 A1* | 3/2005 | DeMello | G06F 21/10 | 705/57 |
| 2005/0131811 A1* | 6/2005 | Ranzini | G06Q 10/107 | 705/39 |
| 2005/0143111 A1* | 6/2005 | Fitzpatrick | H04W 76/005 | 455/518 |
| 2005/0160167 A1* | 7/2005 | Cheng | G06Q 10/06 | 709/224 |
| 2005/0182837 A1* | 8/2005 | Harris | H04L 67/10 | 709/226 |
| 2005/0198193 A1* | 9/2005 | Halme | G06F 17/30784 | 709/217 |
| 2005/0221799 A1* | 10/2005 | Tervo | G06F 21/88 | 455/411 |
| 2005/0251557 A1* | 11/2005 | Yoshizawa | H04L 67/24 | 709/206 |
| 2005/0267973 A1 | 12/2005 | Carlson et al. | | |
| 2006/0031370 A1* | 2/2006 | Lyle | H04L 12/581 | 709/207 |
| 2006/0034195 A1* | 2/2006 | Blaiotta | H04L 65/1006 | 370/261 |
| 2006/0052091 A1* | 3/2006 | Onyon | H04L 29/12047 | 455/415 |
| 2006/0053047 A1* | 3/2006 | Garcia et al. | 705/14 | |
| 2006/0075131 A1* | 4/2006 | Douglas et al. | 709/230 | |
| 2006/0077428 A1* | 4/2006 | Lovat | H04N 1/00204 | 358/1.15 |
| 2006/0085545 A1* | 4/2006 | Borella | H04L 29/06027 | 709/227 |
| 2006/0106932 A9* | 5/2006 | Behrens | H04L 29/06 | 709/227 |
| 2006/0161646 A1* | 7/2006 | Chene | G06F 17/243 | 709/223 |
| 2006/0167860 A1* | 7/2006 | Eliashberg et al. | 707/3 | |
| 2006/0168095 A1* | 7/2006 | Sharma | G06F 17/30905 | 709/217 |
| 2006/0173985 A1* | 8/2006 | Moore | G06F 17/3089 | 709/223 |
| 2006/0178918 A1* | 8/2006 | Mikurak | 705/7 | |
| 2006/0183467 A1* | 8/2006 | Stewart | H04L 29/06 | 455/414.3 |
| 2006/0234690 A1* | 10/2006 | Itzkovitz | H04L 29/06027 | 455/416 |
| 2006/0248185 A1* | 11/2006 | Morris | G06Q 10/109 | 709/224 |
| 2006/0287916 A1* | 12/2006 | Starr et al. | 705/14 | |
| 2006/0288424 A1* | 12/2006 | Saito | H04N 7/1675 | 726/26 |
| 2007/0011157 A1* | 1/2007 | Tang | 707/6 | |
| 2007/0022174 A1* | 1/2007 | Issa | H04L 67/104 | 709/217 |
| 2007/0022306 A1* | 1/2007 | Lindsley | G06F 21/10 | 713/193 |
| 2007/0027921 A1* | 2/2007 | Alvarado et al. | 707/104.1 | |

(56) References Cited

U.S. PATENT DOCUMENTS

| | | | |
|---|---|---|---|
| 2007/0028000 A1* | 2/2007 | Ebbesen | H04L 45/00 709/238 |
| 2007/0028293 A1* | 2/2007 | Boerries | H04L 67/327 726/2 |
| 2007/0041336 A1* | 2/2007 | Wan | H04L 29/12009 370/256 |
| 2007/0047523 A1* | 3/2007 | Jiang | H04M 3/02 370/352 |
| 2007/0061487 A1* | 3/2007 | Moore et al. | 709/246 |
| 2007/0100978 A1* | 5/2007 | Levi | H04L 12/5855 709/223 |
| 2007/0124045 A1* | 5/2007 | Ayoub | G06F 21/10 701/36 |
| 2007/0124776 A1* | 5/2007 | Welk | H04H 20/40 725/75 |
| 2007/0136360 A1* | 6/2007 | Randall | H04M 1/576 |
| 2007/0136608 A1* | 6/2007 | Kirovski | G06Q 20/06 713/193 |
| 2007/0143279 A1* | 6/2007 | Yao et al. | 707/5 |
| 2007/0150508 A1* | 6/2007 | Tseytin | G06F 11/3612 |
| 2007/0150596 A1* | 6/2007 | Miller | G06F 21/10 709/226 |
| 2007/0150608 A1* | 6/2007 | Randall | H04L 67/26 709/228 |
| 2007/0160070 A1* | 7/2007 | Buchhop | H04L 67/26 370/401 |
| 2007/0162582 A1* | 7/2007 | Belali | G06F 1/3209 709/223 |
| 2007/0198745 A1* | 8/2007 | Fornari | H04L 67/1095 709/248 |
| 2007/0238450 A1* | 10/2007 | Hogberg | G06F 21/121 455/418 |
| 2007/0250591 A1* | 10/2007 | Milic-Frayling | H04L 29/12122 709/217 |
| 2007/0260674 A1* | 11/2007 | Shenfield | G06F 17/30864 709/203 |
| 2007/0288934 A1* | 12/2007 | Khan | G06F 9/466 719/318 |
| 2007/0299972 A1* | 12/2007 | Brake | G06Q 10/107 709/226 |
| 2008/0040433 A1* | 2/2008 | Glasgow | 709/206 |
| 2008/0040441 A1* | 2/2008 | Maes | H04L 12/581 709/207 |
| 2008/0065548 A1* | 3/2008 | Muijen | H04N 7/1675 705/51 |
| 2008/0126476 A1* | 5/2008 | Nicholas et al. | 709/203 |
| 2008/0155654 A1* | 6/2008 | Ross | H04L 9/321 726/2 |
| 2008/0189293 A1* | 8/2008 | Strandel | G06Q 10/107 |
| 2008/0233979 A1* | 9/2008 | Li | H04L 12/1859 455/466 |
| 2008/0288578 A1* | 11/2008 | Silfverberg | G06F 17/30581 709/203 |
| 2009/0158436 A1* | 6/2009 | Base | G06F 21/10 726/26 |
| 2009/0253444 A1* | 10/2009 | Tian | H04L 12/587 455/466 |
| 2009/0300162 A1* | 12/2009 | Demarie | H04L 67/26 709/224 |
| 2010/0094878 A1* | 4/2010 | Soroca | G06F 17/30035 707/748 |
| 2010/0192175 A1* | 7/2010 | Bachet | G06Q 10/0637 725/31 |
| 2010/0234018 A1* | 9/2010 | Lawler | H04L 12/5895 455/426.1 |
| 2011/0150362 A1* | 6/2011 | Mitra | H04N 1/00228 382/286 |
| 2011/0231499 A1* | 9/2011 | Stovicek | H04M 1/72547 709/206 |
| 2011/0269424 A1* | 11/2011 | Multer | H04L 67/1095 455/411 |
| 2012/0036154 A1* | 2/2012 | Vellaikal | H04L 29/12896 707/770 |
| 2012/0185440 A1* | 7/2012 | Nguyenphu | G06Q 10/109 707/674 |
| 2012/0246267 A1* | 9/2012 | Mallet | G06Q 50/01 709/217 |

FOREIGN PATENT DOCUMENTS

| | | | | |
|---|---|---|---|---|
| JP | 2002-344529 | | 11/2002 | |
| JP | 2002-344529 A | | 11/2002 | |
| KR | WO 2009022875 A2 * | 2/2009 | | H04L 12/581 |
| KR | WO 2009022875 A3 * | 4/2009 | | H04L 12/581 |

OTHER PUBLICATIONS

Merriam-Webster, "processor", 2015.*
Luzzati et al., "Communications availability", WO 2002037812 A2, 2002.*
IceWarp, "SMS Service Reference", 2012.*
Cover, "The SyncML Initiative", 2003.*
Meissner, "Synchronica Pushes Social Networking and News to Every Mobile Phone", 2009.*
Geekzone, "Microsoft Windows Mobile Smartphone 2003 sneak peek", 2003.*
Arnby et al., "WAP 2.x architecture—Features, services and functions", 2001.*
Bernholdt et al., "Tools for Handheld Supercomputing: an Assessment of the Wireless Application Protocol (WAP)", 2000.*
Gregson, "SyncML initiative releases specification v1.0", 2000.*
IceWarp Unified Communications, "SyncML Push Guide Version 10.4", 2012.*
Jonsson et al., "SyncML—Getting the mobile Internet in sync", 2001.*
Merriam-Webster, "economic", 2016.*
Sabat, "The evolving mobile wireless value chain and market structure", 2002.*
Yeun et al., "Secure M-Commerce with WPKI", 2001.*
Day et al., "A Model for Presence and Instant Messaging", RFC2778, 2000.*
Ericsson, "SyncML Representation Protocol, version 1.0", 2000.*
Ericsson, "SyncML Representation Protocol, version 1.0.1", 2001.*
Jonsson et al., "SyncML—Getting to mobile Internet in sync", 2001.*
Ma et al., "Data Synchronization Infrastructure with Middleware", 2007.*
Ren et al., "Data Synchronization in the Mobile Internet", 2002.*
Rishi et al., "Presence and Its Effect on Network", 2005.*
Saint-Andre, "Extensible Messaging and Presence Protocol (XMPP): Instant Messaging and Presence", RFC3921, 2004.*
Saint-Andre, "Extensible Messaging and Presence Protocol (XMPP): Instant Messaging and Presence", RFC3921, 2011.*
Smets-Solanes et al., "ERP5: A Next-Generation, Open-Source ERP Architecture", 2003.*
Sugano et al., "Presence Information Data Format (PIDF)", RFC 3863, 2004.*
SyncML Initiative, "Building an Industry-Wide Mobile Data Synchronization Protocol", 2000.*
The International Search Report for PCT Application No. PCT/IB2007/001640; Filed Jun. 19, 2007; Date of Completion Jan. 15, 2008; Date of Mailing Jan. 17, 2008.
The Written Opinion for PCT Application No. PCT/IB2007/001640; Filed Jun. 19, 2007; Date of Completion Jan. 15, 2008; Date of Mailing Jan. 17, 2008.
*Wireless Village the Mobile IMPS Initiative, System Architecture Model, Version 1.1*, Ericsson, 2001-2002, 13 pages.
*Opera Platform™ Enabling Web Applications on Mobile Phones*, Opera Software ASA, 2 pages.
Canadian Office Action corresponding to Application No. 2 650 858, issued on Mar. 15, 2013.
Canadian Office Action for related application No. 2 650 858, dated Apr. 17, 2014, 8 pages.

(56) References Cited

OTHER PUBLICATIONS

Canadian Office Action for corresponding CA Application No. 2 650 858, May 19, 2011, pp. 1-3.
Office Action for related Canadian Application No. 2 650 858 dated Apr. 4, 2012, pp. 1-5.
Office Action from Canadian Patent Application No. 2,650,858, dated Apr. 7, 2015.
Extended European Search Report for corresponding European Application No. 07789428.5 dated Mar. 27, 2017.

* cited by examiner

METHOD, APPARATUS AND COMPUTER PROGRAM PRODUCT FOR PROVIDING AUTOMATIC DELIVERY OF INFORMATION TO A TERMINAL

TECHNOLOGICAL FIELD

Embodiments of the present invention relate generally to mobile terminal technology and, more particularly, relate to a method, apparatus and computer program product for employing automatic delivery of information to a mobile terminal.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device or another mobile terminal in order to share information, perform a task or achieve a goal. The services may be provided from an application that runs at a network server or other network device, or even from the mobile terminal such as, for example, a mobile telephone, a mobile television, a mobile gaming system, etc.

As mobile electronic devices become more and more ubiquitous, it is increasingly common for people to integrate such devices into their social lives. Communications with friends and even meeting new friends can often be facilitated using mobile terminals. In this regard, there have been numerous Internet based and other services directed at integrating communication and socialization via mobile terminals. For example, certain applications such as blogs, photoblogs, social bookmarking, podcasts, and numerous others, enable the sharing of information or expression between users of mobile electronic devices. Such applications often provide further services beyond mere collections of person information such as pictures, audio files, video files, etc. in order to enhance the socialization capabilities and enjoyment of the participants. For example, participants may be able to comment on content of another, add another's content to their own favorites, reply to another's content with content of their own, etc. Additionally, such services are often benefited when they can be provided with a relatively high level of immediacy.

A typical model of currently available social applications would include two general aspects. First, user A provides information for consumption by other users. The information may be provided, for example, by posting comments or pictures to a blog or other suitable web based service. Second, user B accesses and consumes the information provided by user A. User B may access the information, for example, by reading blog posts, browsing pictures, etc.

Although the model above is sufficient to provide information to other users, some may consider that current implementations are not yet able to provide information regarding multiple users to a single consumer in a comprehensive and yet simple way. For example, if user B wishes to access information provided by users C and D in addition to the information provided by user A, it is common that user B will be required to access information provided by each of the users (A, C and D) separately, thereby increasing the time and effort required to access such information and decreasing the enjoyment of user B. Furthermore, if users A, C or D should update their information, currently, in mobile environments, applications do not provide a mechanism by which user B can automatically receive such updated information in response to the update since such a capability often creates concerns regarding resource consumption. To the contrary, current applications would typically require user B to manually search for updated information or respond to an invitation from user A, C or D to view new information. Although some applications provide for periodic scheduled updates, the updates are not automatically provided to other users (i.e., "pushed") in response to the update itself.

Thus, a need exists to provide a mechanism by which to automatically provide updated information to users in a comprehensive and yet simple way, which may also improve the experiences of users in mobile environments.

BRIEF SUMMARY

A method, apparatus and computer program product are therefore provided to enable efficient information exchange between individuals via electronic devices. In particular, a method, apparatus and computer program product are provided that allow a user, for example, of a mobile terminal to receive "pushed" updates from other users regarding information provided by the users. In this regard, embodiments of the present invention provide for using a phonebook application, which may also be referred to as a contact or address book application, to view, organize and access information related to particular individuals who are associated with a phonebook entry. Accordingly, more efficient viewing of social or person information associated with contacts listed in the phonebook may be accomplished. Additionally, a user of a mobile terminal may be automatically informed, via the phonebook application, of updates to information associated with a particular individual in response to changes being made to the information and without further effort beyond accessing a link to the updated information. Furthermore, embodiments of the present invention may enable a user to simultaneously view the status of information related to each of various different contacts simultaneously. Accordingly, the efficiency and quality of experiences related to sharing and accessing information associated with contacts for users of mobile terminals may be improved.

In one exemplary embodiment, a method of providing automatic delivery of information to a terminal is provided. The method includes receiving information corresponding to new content associated with a particular service, retrieving an identifier of a publisher associated with the particular service in response to receipt of the information, and in response to receipt of the information, pushing an indication of the new content to a receiving terminal having the identifier in a contact list of the receiving terminal.

In another exemplary embodiment, a computer program product for providing automatic delivery of information to a terminal is provided. The computer program product includes at least one computer-readable storage medium having computer-readable program code portions stored therein. The computer-readable program code portions include first, second and third executable portions. The first executable portion is for receiving information corresponding to new content associated with a particular service. The second executable portion is for retrieving an identifier of a publisher associated with the particular service in response to receipt of the information. The third executable portion is for pushing an indication of the new content to a receiving terminal having the identifier in a contact list of the receiving terminal in response to receipt of the information.

In another exemplary embodiment, an apparatus for providing automatic delivery of information to a terminal is provided. The apparatus includes a communication element, a registry element and a proxy element. The communication element is configured to receive information corresponding to new content associated with a particular service. The registry element is configured to retrieve an identifier of a publisher associated with the particular service in response to receipt of the information. The proxy element is configured to push an indication of the new content to a receiving terminal having the identifier in a contact list of the receiving terminal in response to receipt of the information.

In another exemplary embodiment, an apparatus for providing automatic delivery of information to a terminal is provided. The apparatus includes means for receiving information corresponding to new content associated with a particular service, means for retrieving an identifier of a publisher associated with the particular service in response to receipt of the information, and means for pushing an indication of the new content to a receiving terminal having the identifier in a contact list of the receiving terminal in response to receipt of the information.

In another exemplary embodiment, a method for receiving automatic delivery of information at a terminal is provided. The method includes a first operation of automatically receiving, at a receiving terminal, an indication of new content from a network device. The new content is associated with an identifier in a contact list of the receiving terminal. The method also includes a second operation of displaying an indicator of the new content in the contact list responsive to receipt of the indication for a contact corresponding to the identifier.

In another exemplary embodiment, a computer program product for receiving automatic delivery of information at a terminal is provided. The computer program product includes at least one computer-readable storage medium having computer-readable program code portions stored therein. The computer-readable program code portions include first and second executable portions. The first executable portion is for automatically receiving, at a receiving terminal, an indication of new content from a network device. The new content is associated with an identifier in a contact list of the receiving terminal. The second executable portion is for displaying an indicator of the new content in the contact list responsive to receipt of the indication for a contact corresponding to the identifier.

In another exemplary embodiment, an apparatus for receiving automatic delivery of information at a terminal is provided. The apparatus includes a display and a processing element. The display is capable of displaying a contact list. The processing element is configured to receive an indication of new content from a network device, and to present an indicator of the new content in a contact list viewable on the display responsive to receipt of the indication for a contact corresponding to an identifier. The new content is associated with the identifier in the contact list of the apparatus.

Embodiments of the invention may provide a method, apparatus and computer program product for advantageous employment in a mobile electronic device environment, such as on a mobile terminal having a phonebook application capable of storing information regarding multiple contacts. As a result, for example, mobile terminal users may enjoy an improved expression, socialization and communication capability.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
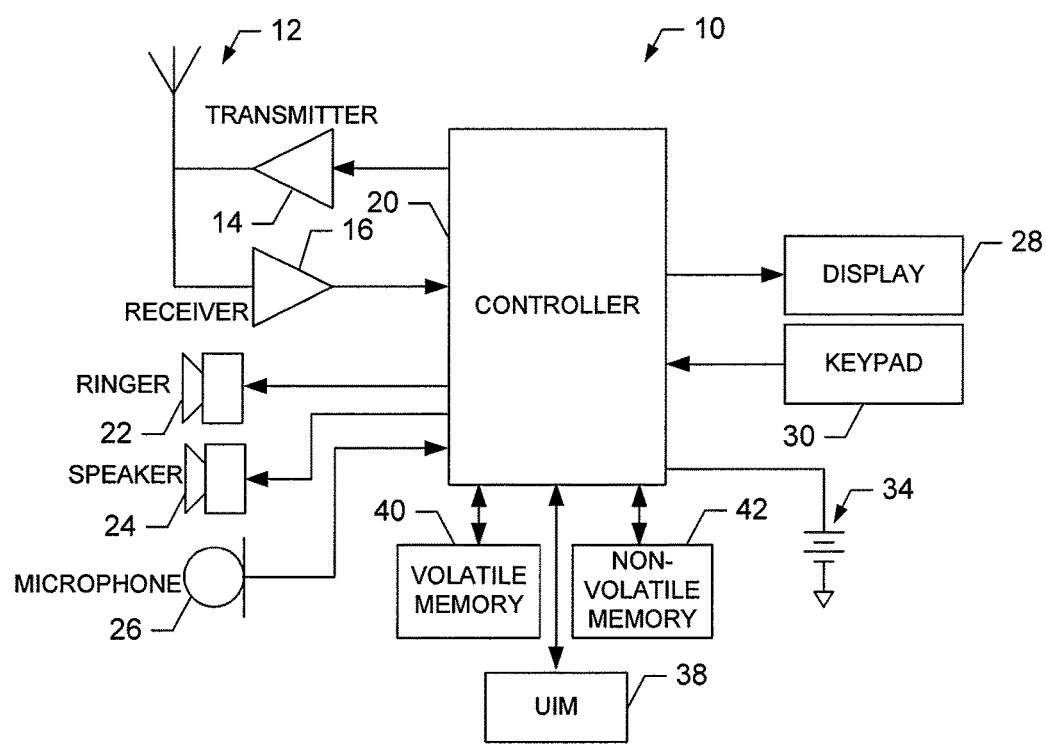
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, and other types of voice and text communications systems, can readily employ embodiments of the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity element (UIM) 38. The UIM 38 is typically a memory device having a processor built in. The UIM 38 may include, for example, a subscriber identity element (SIM), a universal integrated circuit card (UICC), a universal subscriber identity element (USIM), a removable user identity element (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
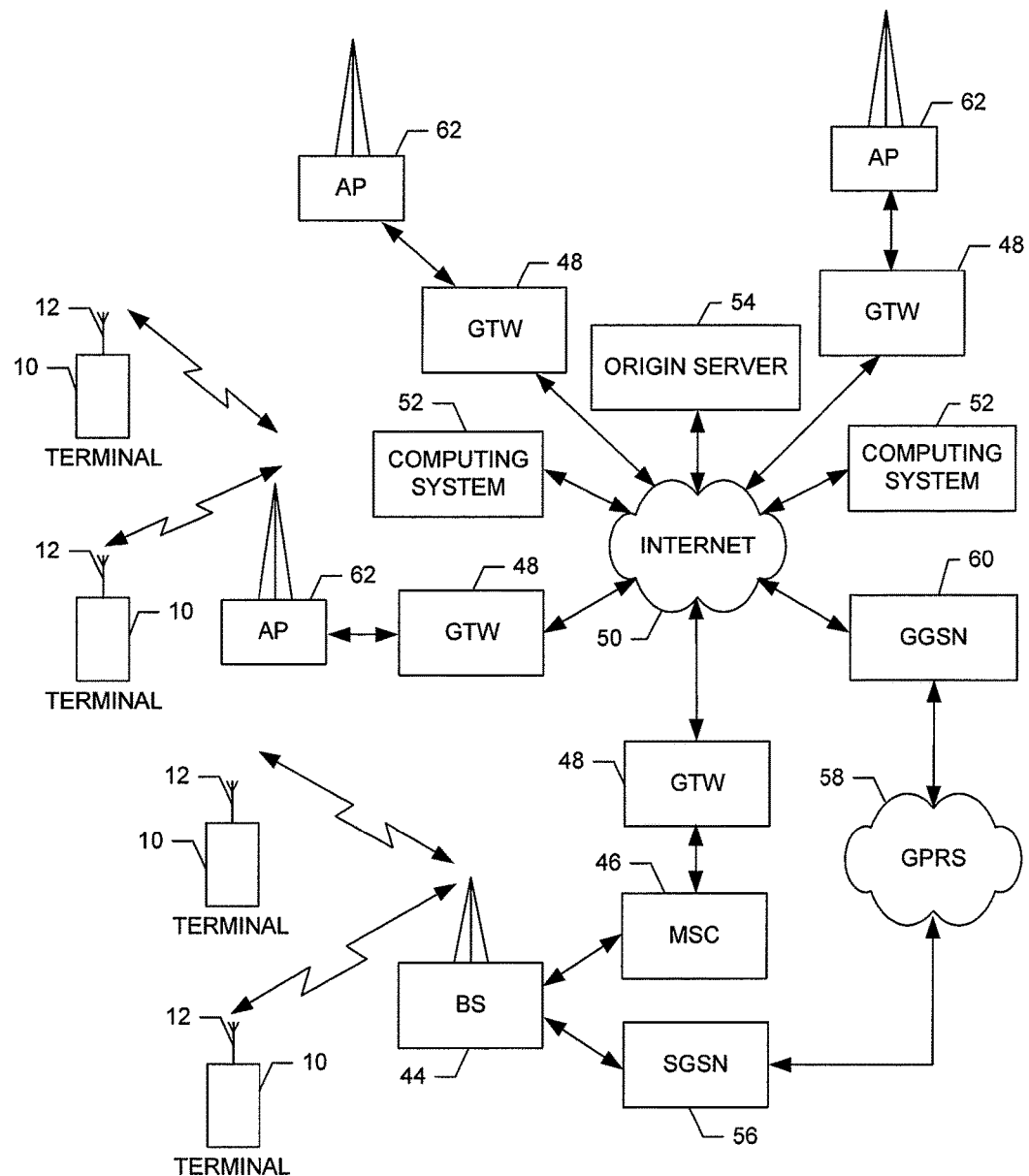
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2 G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3 G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
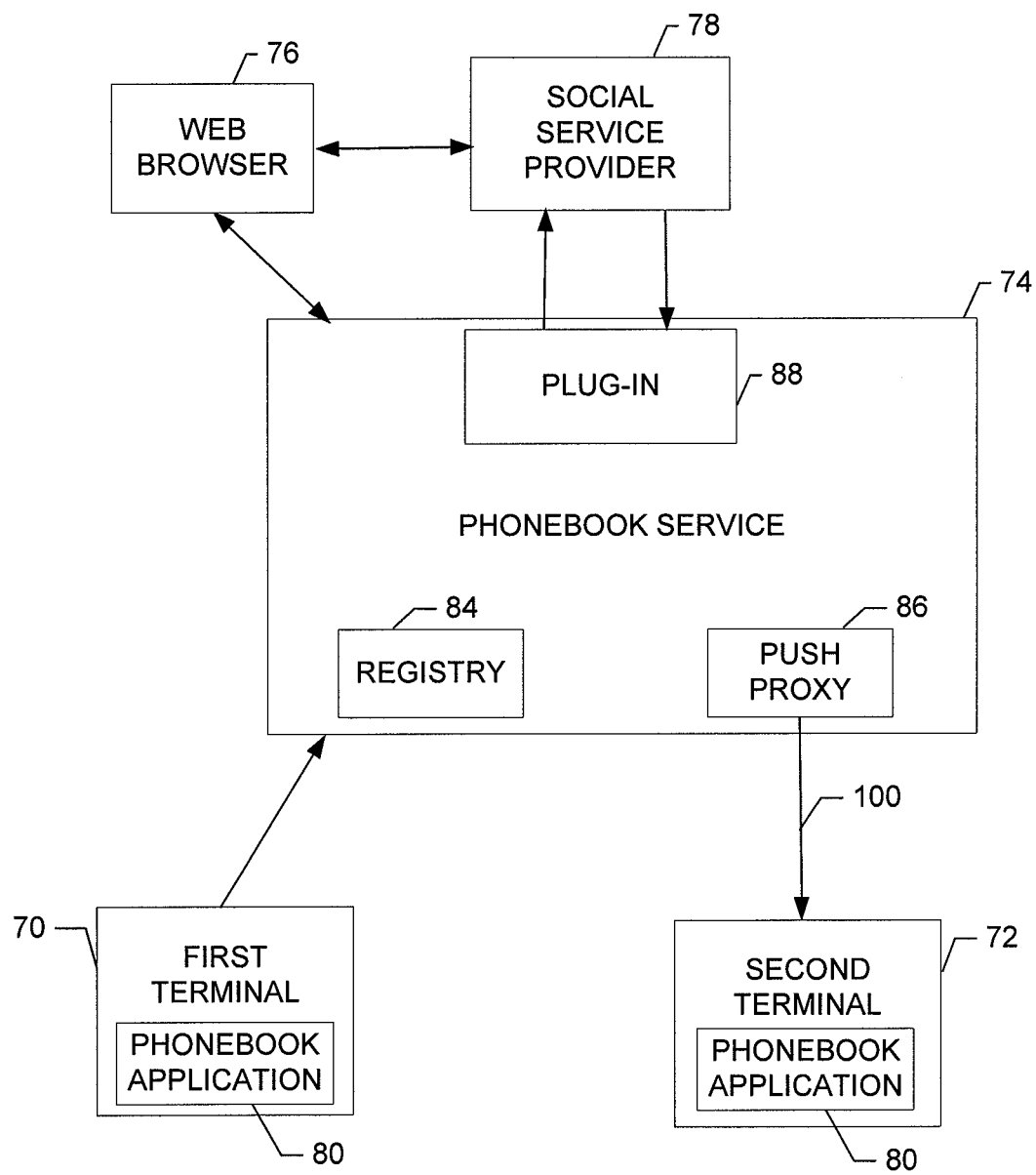
FIG. 3 illustrates a block diagram of portions of a system for providing automatic delivery of information to a terminal according to an exemplary embodiment of the present invention.

An exemplary embodiment of the invention will now be described with reference to FIG. 3, in which certain elements of a system for providing automatic delivery of information to a terminal are displayed. The system of FIG. 3 may be employed, for example, in conjunction with the mobile terminal 10 of FIG. 1. However, it should be noted that the system of FIG. 3, may also be employed with a variety of other devices, both mobile and fixed, and therefore, the present invention should not be limited to application with devices such as the mobile terminal 10 of FIG. 1. For example, the system of FIG. 3 may be employed with a network device such as a remote server, etc. In one exemplary embodiment, as shown in FIG. 3, the mobile terminal 10 of FIG. 1 may be utilized to display information accessed from a network device in connection with a phonebook application stored or otherwise accessible at the mobile terminal 10. It should also be noted, however, that while FIG. 3 illustrates one example of a configuration of a system for providing automatic delivery of information to a terminal, numerous other configurations may also be used to implement embodiments of the present invention.

Referring now to FIG. 3, a system for automatic delivery of information to a terminal is provided. The system includes a first terminal 70, a second terminal 72, a phonebook service 74, a web browser 76 and a social service provider 78. It should be noted that the phonebook service 74 and the web browser 76 may be applications that may be collocated in a single device. For example, a server such as the origin server 54 of FIG. 2, may host both the phonebook service 74 and the web browser 76. Alternatively, the phonebook service 74 and the web browser 76 may be hosted at different devices. For example, the phonebook service 74 may be disposed at a server, while the web browser 76 is disposed at a mobile terminal in communication with the server. Meanwhile, either or both the first and second terminals 70 and 72 may be embodied as either the mobile terminal 10 of FIG. 1, or another electronic device capable of communication with other electronic devices via wired or wireless communication methods as described above. Both the first and second terminals 70 and 72 may include a phonebook application 80 that is capable of communication with the phonebook service 74 for sending information to or receiving information from the phonebook service 74. The phonebook application 80 may also include mechanisms by which to manage, edit, view, etc. contact information regarding various contacts such as friends, acquaintances, or associates of the user of the phonebook application 80.

In an exemplary embodiment, each of the phonebook service 74, the web browser 76 and the phonebook application 80 may be any device or means embodied in either hardware, software, or a combination of hardware and software that is capable of performing the functions associated with each of the corresponding elements described below. In one embodiment, for example, the phonebook application 80 may be embodied in software instructions stored in a memory of the mobile terminal 10 and executed by a processing element such as the controller 20. However, each of the elements above may alternatively operate under the control of a corresponding local processing element or a processing element of another device not shown in FIG. 3. A processing element such as those described above may be embodied in many ways. For example, the processing element may be embodied as a processor, a coprocessor, a controller or various other processing means or devices including integrated circuits such as, for example, an ASIC (application specific integrated circuit).

The social service provider 78 may be any service provider known in the art and may be capable of communication via any suitable web syndication mechanism such as Really Simple Syndication (RSS) (which may also be known as Rich Site Summary or RDF Site Summary), Atom, or other proprietary application programming interfaces (APIs) or web services. In this exemplary embodiment, the service provided by the social service provider 78 is assumed to be a social service such as a blog, photo library, video library, personal web page, etc. However, other services may also be provided in other embodiments. As shown in FIG. 3, the social service provider 78 may be in communication with both the web browser 76 and the phonebook service 74.

In an exemplary embodiment, the phonebook service 74 may be embodied at a network device such as a server and may include a registry 84, a push proxy 86 and a plug-in 88. It should be noted that the plug-in 88 of FIG. 3 may represent a plurality of plug-ins in which, for example, each of the plug-ins is associated with a particular social service provider. The registry 84 may be any storage device, such as a database, for use in mapping an identifier of a particular contact or entity to information or social services associated with the particular contact. For example, the registry may store mappings of information or social services such as a blog, photoblog, personal web page, etc. and the identifier of the creator or owner of the information or social services. In an exemplary embodiment in which the second terminal 72 seeks to access information corresponding to social services associated with the first terminal 70, the identifier may be, for example, a phone number of the first terminal 70.

Figure 4:
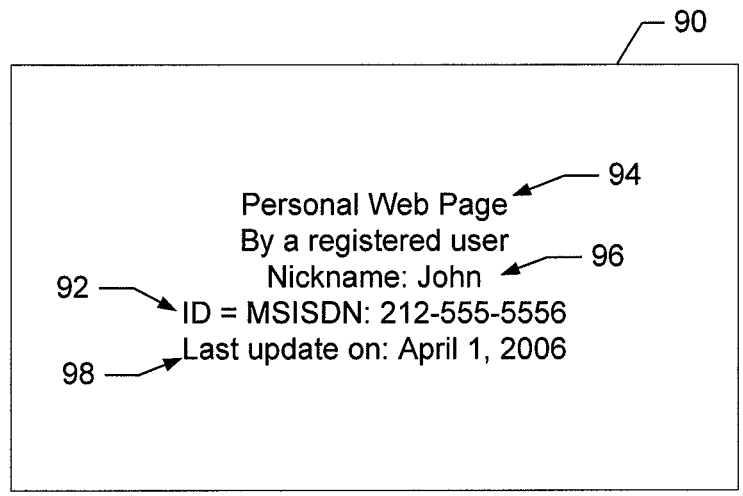
FIG. 4 is an illustration of a registry entry according to an exemplary embodiment of the present invention.

The registry 84 may include a plurality of registry entries. FIG. 4 illustrates an example of information that may be associated with a registry entry 90. It should be noted that the registry entry 90 of FIG. 4 is merely exemplary and any suitable configuration or format for the registry entry 90 is also possible. The registry entry 90 may be generated by the phonebook service 74 in response to the explicit definition of a particular social service as being associated with an identifier 92. In this regard, for example, a user associated with a terminal having the identifier 92 may access the phonebook service 74 and define that a particular social service corresponds to the identifier 92. As an example, John may be the user of the first terminal 70 and have a blog (www.blog.john.com). The registry entry 90 for John's blog could be created in response to John accessing the phonebook service 74 via either the web browser 76 or the first terminal 70 and defining the blog www.blog.john.com as his blog. The registry entry 90 may then be made to map the identifier to the social service or services associated with the identifier. It should be noted that the registry entry 90 may be reused for subsequent adding of the same contact to other phonebooks.

It should be noted that the term contact list, as used herein, refers to any listing of contacts having associated contact information. In this regard, contact list could include any phonebook, address book, or other collection of information related to specific users, devices, etc. For example, the contact list could be a listing of contacts from Microsoft Outlook or any similar application as is well known in the art.

The registry entry 90 may include the identifier 92 of the terminal or entity associated with the registry entry 90 and any associated social services for which content intended for publication via the social service provider 78 may be submitted via, for example, the web browser 76. As such, the social services are mapped to the identifier 92. The identifier 92 may be, for example, a telephone number, a Mobile Station Integrated Services Digital Network (MSISDN) number, email or other personal identification number. The identifier 92 is typically a unique data element that identifies a particular entity or terminal. Thus, when used in the registry entry 90, the identifier 92 identifies the entity or terminal that is associated with, and thus may edit, the information or content of the social services associated with the identifier 92. The registry entry 90 may also include a descriptor 94 which identifies or describes a type of the social service or services associated with the identifier 92 for a particular registry entry. For example, as shown in FIG. 4, the descriptor 94 may indicate that the social service is a personal web page. Alternatively, the descriptor 94 could indicate that the social service is a photo library, a blog, a video library, etc. It should be noted that although only one descriptor 94 is indicated in FIG. 4, the registry entry 90 could include multiple descriptors corresponding to each of multiple social services associated with the identifier 92. Optional features of the registry entry 90 may include a nickname 96 associated with the user of the terminal or entity associated with the registry entry 90 and/or a temporal indicator 98 indicating the date and/or time of the last update of information associated with the social service. Thus, for example, if an individual with the nickname "Frankie" has a personal web page associated with a mobile terminal having a phone number of 212-555-5555, which was last edited on Apr. 1, 2006, the registry entry 90 of FIG. 4 may be stored in the registry 84. The registry entry 90 may further include access restrictions that may be applied by the user associated with the identifier 92. As such, rules regarding which other users may access social service information published by the user associated with the identifier 92, or under what conditions other users may access social service information published by the user associated with the identifier 92. In this regard, the access restrictions may include presence information related to the user associated with the identifier 92. For example, if the presence information related to the user indicates that the user is unavailable, for example, due to being in a meeting, then corresponding access rules may modify the ability of other users to access the social service information until the user becomes available.

Figure 5:
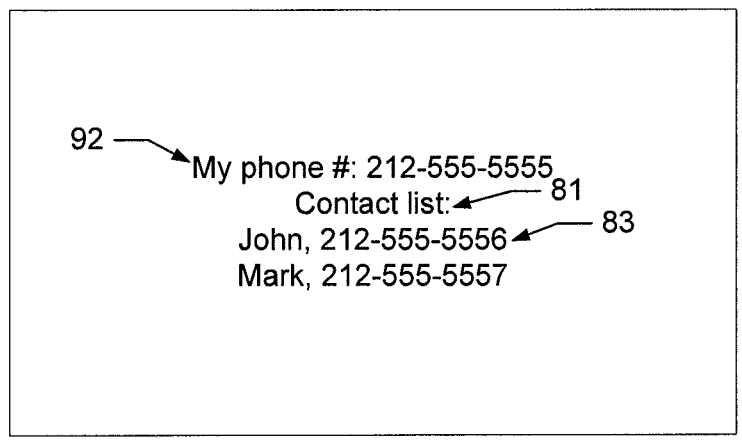
FIG. 5 is an illustration of a contact list according to an exemplary embodiment of the present invention.

In an exemplary embodiment, the phonebook service 74 may be capable of determining which other users or terminals have any particular user (such as the user associated with the identifier 92) in their respective contact lists. In this way, when the user associated with the identifier 92 modifies or adds new content to a social service, the other users or terminals that have the user associated with the identifier 92 in their respective contact lists may have indications of such new or modified content automatically delivered to the other users or terminals. Information regarding which other users or terminals have the user associated with the identifier 92 in their respective contact lists or may be gathered, for example, in response to routine storage of contact lists or phonebooks at network servers for backup purposes or in response to synchronization between contact lists kept at both at a network server and a mobile terminal. Alternatively, either the registry 84 or another storage element within or accessible to the phonebook service 74 may include a list of individuals or other entities which have the user associated with the identifier 92 included in, for example, a contact list of a terminal associated with the individuals or other entities in their respective contact lists. In this regard, the information for generating the list of individuals or other entities which have the user associated with the identifier 92 included in their respective contact list, may be generated based upon referencing copies of contact lists or contact lists of various terminals stored for backup purposes as described above. For example, as shown in FIG. 5, the second terminal 72 may include the phonebook application 80 for managing a contact list 81 having contact information for a plurality of contacts 83 or other terminals including the first terminal 70. The contact information may include, for example, the identifier 92 such as the phone number of the first terminal 70.

The phonebook application 80 may be stored at each terminal for management of contact information associated with the each contact 83. Other than the features described below, the phonebook application 80 may be similar to those known in the art. In other words, the phonebook application may include a mechanism to add, edit, delete, etc. contact information associated with the contacts 83. Furthermore, new contacts may be added, existing contacts may be deleted, or contacts may be edited.

The plug-in 88 may be any device or means embodied in either hardware, software, or a combination of hardware and software that is capable of communication with any particular type of on-line service. As such, the plug-in 88 is capable of translating data between a protocol used by the social service provider 78 and a protocol or format to be used for communication with mobile terminal devices. In this regard, the plug-in 88 is a communication element capable of accessing changes made to dynamic data associated with a particular social service, for example, by a user of the first terminal 70. Dynamic data should be understood to encompass data or information that is published by a user, such as the user of the first terminal 70, for consumption by other users. In this regard, dynamic data may include, but is not limited to, photos, text, video data, audio data, graphics, etc. Changes to the dynamic data made by user of the first terminal 70 may be accomplished via, for example, the web browser 76 using the first terminal 70 or any other electronic device capable of executing the web browser 76 such as a PC or laptop computer. In other words, the user of the first terminal 70 may execute an application via the web browser 76 which, for example, enables the user of the first terminal 70 to modify the dynamic data associated with a personal web page of the user of the first terminal 70. It should be noted, however, that other mechanisms for changing the dynamic data also exist, such as other applications that are executable by a PC or a mobile terminal (e.g., applications for uploading pictures to Flickr from a mobile terminal). The changes to the dynamic data may then be published via the social service provider 78. Such changes to the dynamic data may then be accessible to other users via the social service provider 78.

According to embodiments of the present invention, the plug-in 88 may communicate with the social service provider 78 by implementing a respective protocol such as, for example, RSS, Atom, or any other web services or proprietary APIs in order to receive indications of changes to the dynamic data of the personal web page of the user of the first terminal 70. The phonebook service 74, being aware of the changes to the dynamic data of a particular social program may then access the registry 84 and determine via the mappings stored therein, which identifier 92 is associated with the particular social program that has been changed. The phonebook service 74 may then distribute indications of the changes (i.e., of the new content) to individuals or other entities (including the second terminal 72) which have the user associated with the identifier 92 included in their respective contact list. The individuals or other entities that have the user associated with the identifier 92 included in their respective contact list then receive an indication 100 of the changes to the dynamic data via the push proxy 86. The indication 100 may include, for example, a link or universal resource locator (URL) to access the changes to the dynamic data. Accordingly, by activating the link, other individuals or entities, such as the second terminal 72, may access the changes to the dynamic data. Alternatively, the indication 100 may include all or a portion of the new content associated with the changes to the dynamic data. If a portion of the new content is included in the indication, the portion of the new content may include, for example, a URL allowing access to remaining portions of the new content.

The push proxy 86 may be any device or means embodied in either hardware, software, or a combination of hardware and software that is capable of implementing a message queue or otherwise providing messages to terminals from the list of individuals or other entities which have the identifier 92 of the first terminal 70 included in either a contact list of the respective phonebook applications of the individuals or other entities. In this regard, in response to the plug-in 88 receiving information from the social service provider 78 indicative of changes to the dynamic data associated with the identifier 92, the push proxy 86 pushes delivery of the indication 100 to each terminal that has the user associated with the identifier 92 included in their respective contact list, based on the stored backup copies of phonebooks, for example, in accordance with access restrictions associated with the registry entry 90.

Figure 6:
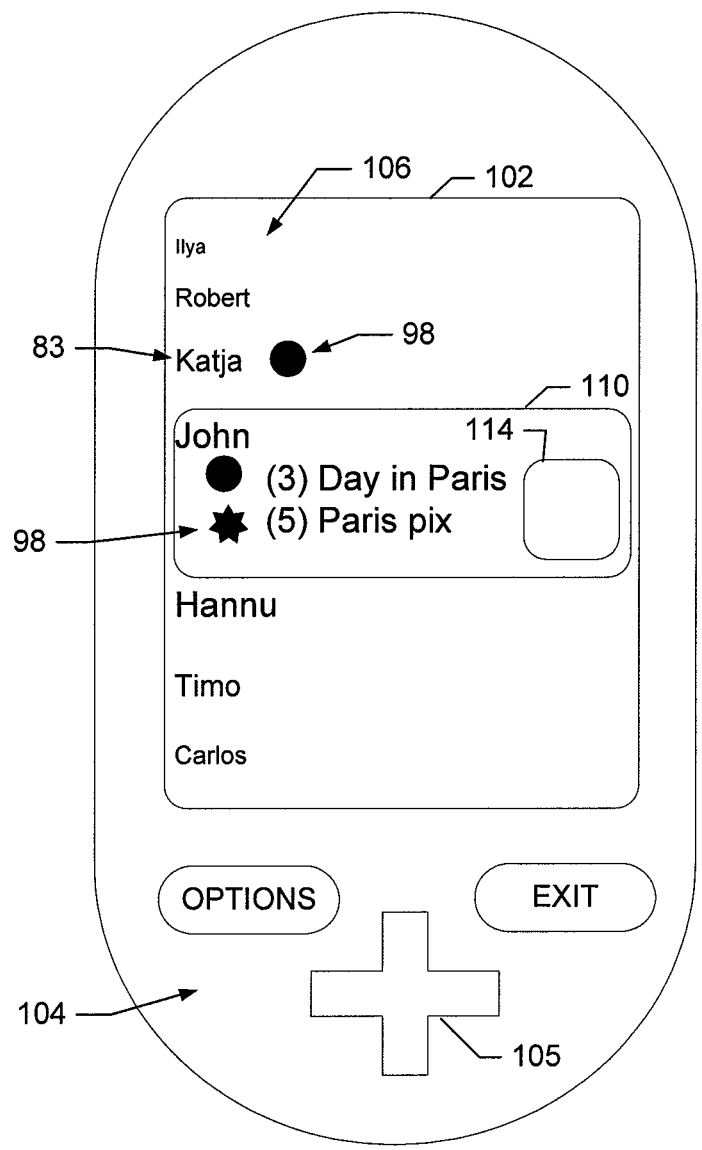
FIG. 6 is an illustration of a terminal display showing a contact list according to an exemplary embodiment of the present invention.

In an exemplary embodiment, the indication 100 may cause display of an indicator 98 which may be, for example, an icon, a change in a property of an icon (such as a change in color, shape, size, etc.), a symbolic flag, or a change in text or an object associated with the contact 83 that is indicative of changes to the dynamic data associated with the identifier 92. In this regard, FIG. 6 illustrates an embodiment of the second terminal 72 in greater detail according to an exemplary embodiment. The second terminal 72 includes a display 102 and a user interface 104. The user interface 104 may include buttons or keys such as OPTION and EXIT or BACK keys and a directional keypad 105 for moving a cursor, for example, or selecting items appearing on the display 102. Alternatively, display 102 could be a touch screen display such that the user interface 104 could be implemented via the display 102 using a stylus, finger or other such implement. The OPTION key may provide particular options associated with the currently displayed screen. For example, with respect to the contact list 106, associated options may include sorting information presented by, for example, alphabetical listings of contacts, contacts having the most recent updates to social program dynamic data, service type. Other options may include calling, emailing, or sending an SMS message to the associated contact. When accessing new content, the options may include storing the new content, for example, to a photo gallery or other collection of stored data. The EXIT or BACK key may be used, for example, to access a previously displayed screen.

The display 102 of FIG. 6 shows a contact list 106. The contact list 106 may be, for example, associated with the phonebook application 80 of the second terminal 72. As shown in FIG. 6, the contact list 106 may include the names or nicknames of a plurality of contacts, each of which may be associated with an identifier such as a phone number, email address, etc., or other data which may be organized in a hierarchical manner. For example, the name or nickname of each contact may be displayed in a list format on a highest hierarchical level, while further information such as the phone number, email address, a photo, or other personalizable information may be displayed at second or subsequent hierarchical levels. The contact list 106 may also include an icon or other indicator which may indicate that changes have been made to dynamic data of a social service associated with the contact. In this regard, the presence of the icon or other indicator may indicate the changes. Alternatively, the icon may indicate that the contact has a social service associated with the contact and a different icon or a change in the appearance of the icon or other indicator (such as by size, color, font, shape, etc.) may indicate the changes. The icon or other indicator may be produced or modified accordingly, based on receipt of the indication 100.

In an exemplary embodiment, a fisheye 110 may be displayed in a center portion of the display 102 indicating a currently highlighted one of the plurality of contacts. The fisheye 110 may display extended information regarding the highlighted contact. In this regard, a contact that appears in the fisheye 110 may correspond to the contact that has been scrolled over using the directional keypad 105. For example, the directional keypad 105 may be used to scroll between adjacent contacts of the contact list 106 with the currently highlighted contact being displayed in the fisheye 110 using a scroll function of the user interface 104. The scroll function may be employed, for example, by selecting an up or down direction using the directional keypad 105 in order to highlight different contacts by placing a different contact in the fisheye 110. Meanwhile, selecting a right or left direction using the directional keypad 105 may either access more detailed contact information (i.e., the next lower hierarchical level) or access the social service having the changed dynamic data.

Alternatively or additionally, the contact list 106 may include changes to the font size of contacts listed in the contact list 106 based on the proximity of the contacts to the fisheye 110. For example, the font size of a particular contact may decrease as distance from the fisheye 110 increases. As such, the largest font may be reserved for contents within the fisheye 110, while the smallest fonts are reserved for contacts that appear on the display at the greatest distance from the fisheye 110. It should be noted that although the exemplary embodiment of FIG. 6 shows the fisheye 110 being disposed in the center of the display 102, any relative positioning may alternatively be employed such as positioning the fisheye 110 at the top or bottom of the display 102.

The extended information included in the fisheye 110 may include a predefined number of lines for displaying predetermined information. For example, in an exemplary embodiment in which the contact list 106 displays name information, the fisheye 110 may be used to further display the identifier of the contact. Alternatively or additionally, the fisheye 110 may further display specific references to changed dynamic data such as an indication of the number of new or changed items of dynamic data, links to the dynamic data that has changed, links to social services associated with the highlighted contact, links to a contact specific entertaining or social services information page, a title or description of the changed items or a sample of changed elements, such as a thumbnail photo 114, etc.

Figure 7:
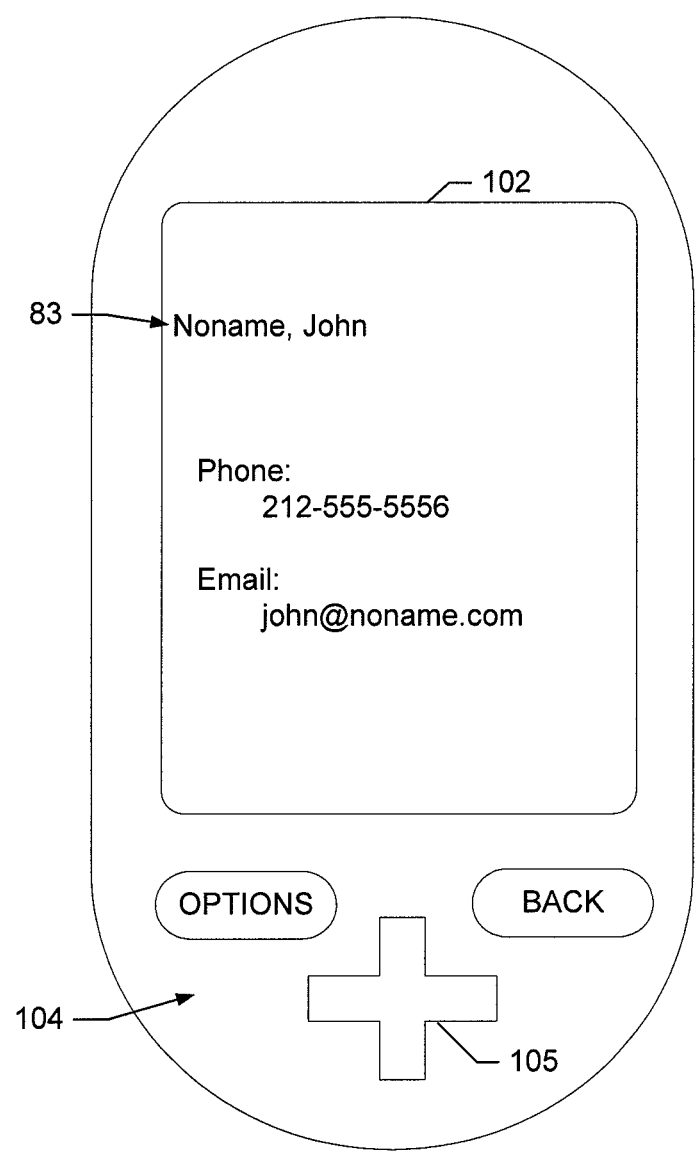
FIG. 7 is an illustration of a terminal display showing more detailed contact information according to an exemplary embodiment of the present invention.

FIG. 7 illustrates an example of a contact information display showing more detailed contact information that may be accessed by selecting an associated function for a particular contact highlighted in the fisheye 110. As shown in FIG. 7, the more detailed contact information may include the identifier of the contact which could include, for example, an email address or a telephone number of the contact. Other information that may be included in the contact information display may include, but is not limited to, home/business/mobile phone numbers, home/business address, birthday, company, job title, etc. The user interface 104 may be used to edit information from the contact information display or to directly access the dynamic data that has changed or the social service associated with the contact.

Figure 8:
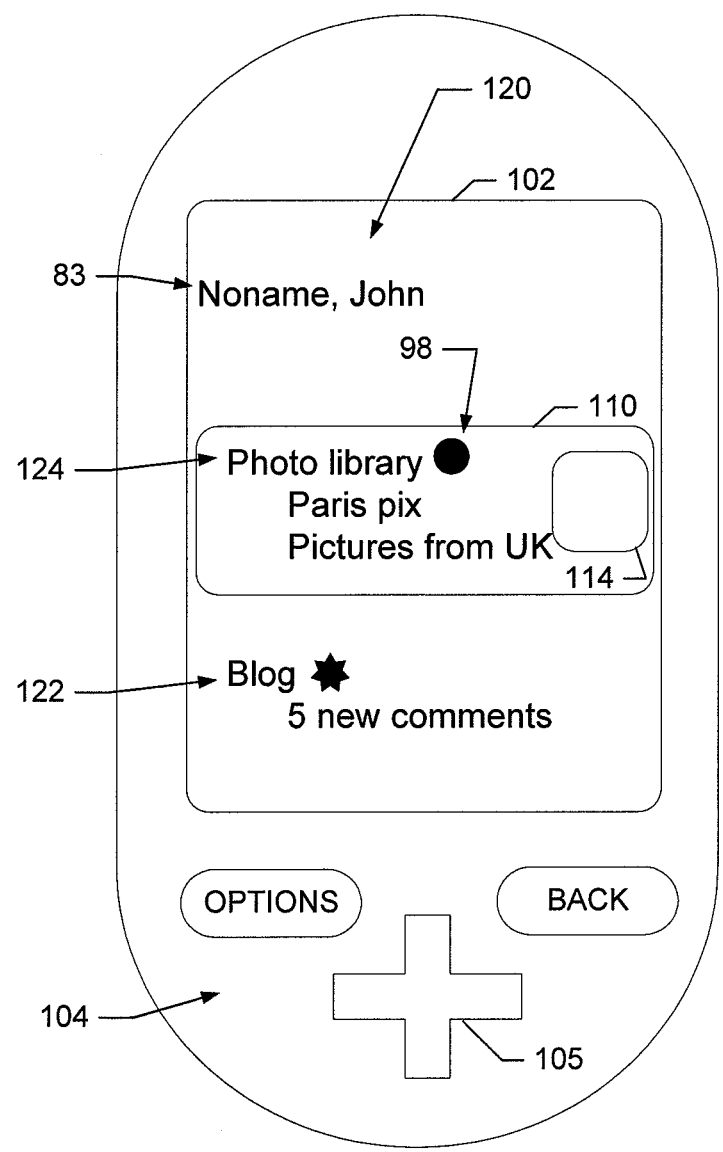
FIG. 8 is an illustration of a terminal display showing a contact specific entertaining or social services information page according to an exemplary embodiment of the present invention.

FIG. 8 illustrates an example of a contact specific entertaining or social services information page 120 according to an exemplary embodiment. It should be understood that the contact specific entertaining or social services information page 120 may be accessed as a lower level in the hierarchical structure associated with a particular contact of the phonebook application 80. As indicated in FIG. 8, the contact specific entertaining or social services information page 120 may provide links to social services associated with the contact 83. In the example of FIG. 8, the contact specific entertaining or social services information page 120 includes links to specific social services such as, for example, a blog 122 and a photo library 124 associated with the contact 83. The contact specific entertaining or social services information page 120 may also include the fisheye 110 for use in selecting or viewing more detailed information associated with a highlighted social service. The detailed information may include information that was adapted for constraints of the mobile terminals (e.g., only excerpts of texts or smaller pictures) and/or a URL for access to the full entry and a mechanism by which to view the full entry (e.g. starting a browser or an embedded browser).

In operation, when a user, such as the user of the first terminal 70, publishes new content (i.e., changes to dynamic data associated with the user of the first terminal 70) via the web browser 76, the new content may include a flag or other indicator to indicate that the content is new. Accordingly, when the new content is published via the social service provider 78, the plug-in 88 of the phonebook service 74 may communicate with the social service provider 78 to receive indications of the new content. The phonebook service 74 may use the registry 84 to determine which identifier (for example, the identifier of the first terminal 70) is associated with the new content using the mappings stored therein. The identifier of the first terminal 70 may then be used to determine which terminals of other users have the user of the first terminal 70 listed as a contact. The push proxy 86 then pushes the indication 100 to respective phonebook applications 80 of the terminals of the other users including, for example, the second terminal 72. Accordingly, when the second terminal 72 views the contact list 106, the contact 83 associated with the user of the first terminal 70 will include indications that the new content is available. As stated above, the indications of the new content may be an icon, or changes in font, color, size, etc. of the icon. The indications of the new content may also include the content itself or a portion of the contact information associated with the contact 83. The indications of the new content may be visible regardless of whether the contact 83 is in the fisheye 110. However, when the second terminal 72 highlights the contact 83, additional information may be received via the fisheye 110 indicating, for example, that the new content including new postings or other published information is available and possibly what type of content the new content is, an indication of the quantity of new content items, or samples of the new content. After reading, viewing or otherwise accessing the new content from the phonebook service 74, the new content will no longer be indicated as being new. In other words, the indications of the new content associated with the contact 83 will be removed. Typically, the content may be stored at the phonebook service 74, for example, at the push proxy 86, in order to minimize consumption of the limited storage space of the second terminal 72. Additionally, processing power used to perform the operations of the phonebook service 74 may be performed at a network server to ensure the limited resources of mobile terminals are not excessively consumed.

When embodiments of the present invention are practiced, indications that new content is available may be automatically pushed to terminals that have the publisher of the new content in their respective contact lists in response to the publication of the new content rather than in response to manual efforts to check for new content or updates that occur at particular time intervals. Accordingly, new content is immediately available to friends or associates of the publisher via a phonebook application. Such functionality is enabled at least in part due to mappings of which social services that may be receiving the new content are associated with a particular publisher via an identifier associated with the publisher. Another benefit of such mappings is that if a particular user changes a social service, when the particular user updates the mapping, other users that have the identifier of the particular user in their contact list will continue to receive updates without any additional effort on the part of the other users.

Figure 9:
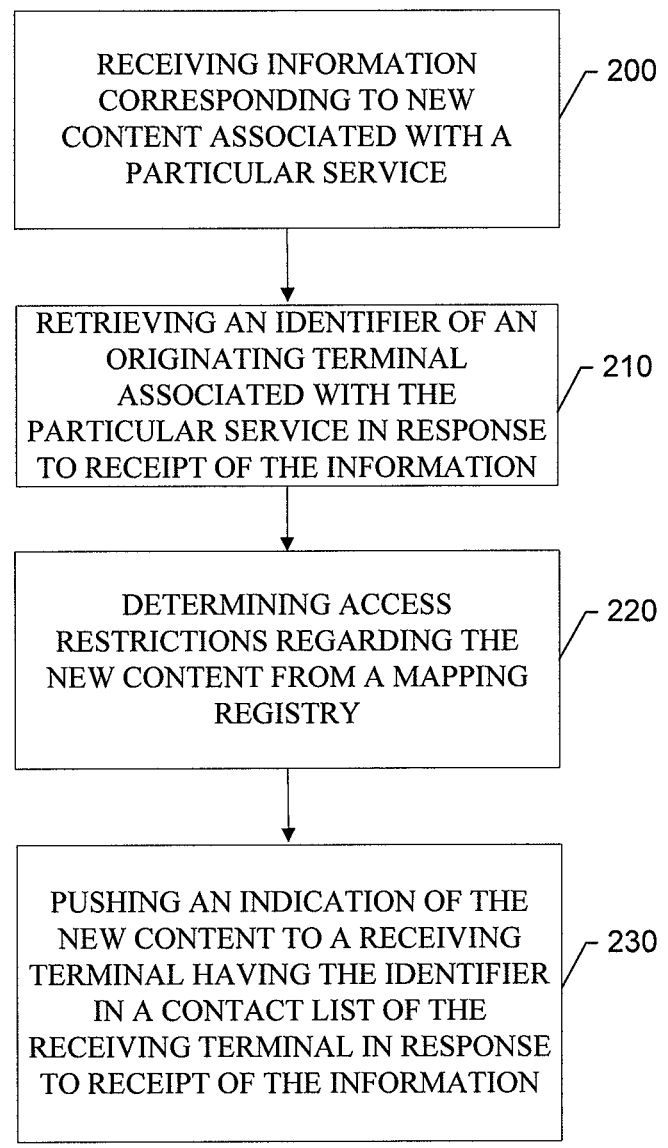
FIG. 9 is a block diagram according to an exemplary method for providing automatic delivery of information to a terminal according to an exemplary embodiment of the present invention.

In an alternative exemplary embodiment, a network device such as a server may host the phonebook service 74 in which the server itself hosts content from various publishers. In this regard, for example, a user having content associated with a web page corresponding to a social service such as a photo library, blog, etc. may upload a contact list of the user (or certain contacts from the contact list) to the server. The phonebook service 74 could check for new content that may be available from each of the contacts uploaded to the server. In this way, the server could host all information, both old content and new content, related to the corresponding contacts in one location. The phonebook service 74 could then push indications of the new content (which as stated above may include portions of the content or the content itself) to a web browser session hosted at the server which may act as the receiving terminal for the indications of the new content. The indications of the new content could be displayed at the web browser session which is then accessible to client devices accessing the server. For example, new content could be indicated differently for corresponding web pages. While the server could also push the indications of the new content to contacts uploaded to the server as described in embodiments above, according to this exemplary embodiment, instead of pushing the indications of new content to the contacts, the web browser session could receive the pushed indications and store the new content for enabling client terminals to access the new content in one location. Accordingly, client devices accessing the server could see, for example, indications of which of their contacts have posted new information and then link to the new information. FIG. 9 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Thus, for example, a user could create a backup of the user's contacts and the backup may be sent to a server (i.e. address book contents uploaded to the server). The user may then log on to the web service, e.g. using a web browser. On the web page the user may see a list of the user's contacts and also an indication associated with each contact entry as to whether each contact has some related information on the service. The server matches the ID (e.g. phone number) to the content and can present the indication based on the matching. If some of those contacts have new content on the service, it could be indicated, for example, with bolded text or with a flag, etc.

Thus, for example, if a user has 100 contacts in the user's address book, and makes a backup of the address book (or sends the contact information to the server). The user may then log on to the service with a browser and see a list of the 100 contacts in any suitable format (e.g. in alphabetical order by last name) with associated indications for each of the contacts that has published new content. For example, Jim may have uploaded new images to the service. Thus, Jim's contact entry on the web page would then show e.g. a bolded entry of "Images" text and/or a small image thumbnail which has a sun on top of it thereby indicating that Jim has uploaded new images to the service since the user's last visit. Different symbols could be used for different content. For example, an image of a CD/cassette for audio content, a miniature web page image for blog entry, etc. The user could also select an option on the service to see only those entries which have updated content. For example, such an option could be toggled to enable display of all contacts or only those with updated content. Alternatively, the user could have dedicated client software to backup the contact details and view them on the service instead of using the web browser to see the contacts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for automatically delivering social service information to a terminal includes receiving information corresponding to new content associated with a particular service at operation 200. Operation 200 may include translating the information from a first format of the particular service to a second format for consumption at the receiving terminal. At operation 210, an identifier of a publisher or perhaps a publishing terminal associated with the particular service is retrieved in response to receipt of the information. It should be noted that the retrieval may simply refer to acquisition of the identifier from the received information in which the identifier may be bundled. Operation 210 may include accessing the identifier based on the particular service via a mapping registry that associates a service with a corresponding identifier of a terminal associated with a user capable of adding the new content to the service. In response to receipt of the information, an indication of the new content is pushed to a receiving terminal having the identifier in a contact list of the receiving terminal at operation 230. At an optional operation 220, access restrictions regarding the new content are determined from a mapping registry. When optional operation 220 is performed, the pushing of the indication at operation 230 may be performed responsive to a determination that the receiving terminal is authorized to receive the new content. The method may include additional initial operations of determining the identifier associated with a new contact and mapping the identifier to social services associated with the identifier.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving information corresponding to new content associated with a particular service;
   in response to receipt of the information corresponding to the new content, identifying, with a processor comprising circuitry, the particular service via a mapping registry that associates a plurality of respective services and identifiers of terminals associated with a publisher of the new content to the respective services, wherein the publisher is a user of the particular service and is represented as a stored contact entry;
   retrieving an identifier of the publisher associated with the particular service based on the particular service identified via the mapping registry;
   further in response to receipt of the information corresponding to the new content, identifying at least one receiving terminal having a stored contact list comprising uniquely identified users and respective contact information, wherein the stored contact list comprises the identifier of the publisher; and
   in response to identifying the at least one receiving terminal having the stored contact list comprising the identifier of the publisher, determining to push an indication of the new content to the at least one receiving terminal, wherein the indication of the new content is associated with a contact entry of the stored contact list and wherein the contact entry is associated with the identifier of the publisher.

2. A method according to claim 1, further comprising determining access restrictions regarding the new content from the mapping registry, wherein the determination to push the indication is performed responsive to a determination that the receiving terminal is authorized to receive the new content.

3. A method according to claim 1, wherein the determination to push the indication comprises causing display of the new content on the receiving terminal.

4. A method according to claim 1, wherein the method further comprises:
in response to the push indication, causing display of an indicator on the receiving terminal, wherein the indicator is displayed in association with the contact entry associated with the identifier of the publisher.

5. A method according to claim 1, wherein receiving the information corresponding to new content comprises determining to translate the information from a first format of the particular service to a second format for consumption at the receiving terminal and based on the receiving terminal.

6. A method according to claim 1, further comprising initial operations of:
determining the identifier associated with a new contact; and
determining to map the identifier to social services associated with the identifier.

7. A non-transitory computer readable storage medium carrying one or more sequences of one or more instructions which, when executed by one or more processors, cause an apparatus to at least perform:
receiving information corresponding to new content associated with a particular service;
in response to receipt of the information corresponding to the new content, identifying the particular service via a mapping registry that associates a plurality of respective services and identifiers of terminals associated with a publisher of the new content to the respective services, wherein the publisher is a user of the particular service and is represented as a stored contact entry;
retrieving an identifier of the publisher associated with the particular service based on the particular service identified via the mapping registry;
further in response to receipt of the information corresponding to the new content, identifying at least one receiving terminal having a stored contact list comprising uniquely identified users and respective contact information, wherein the stored contact list comprises the identifier of the publisher; and
in response to identifying the at least one receiving terminal having the stored contact list comprising the identifier of the publisher, determining to push an indication of the new content to the at least one receiving terminal, wherein the indication of the new content is associated with a contact entry of the stored contact list and wherein the contact entry is associated with the identifier of the publisher.

8. The non-transitory computer readable storage medium according to claim 7, further comprising determining access restrictions regarding the new content from the mapping registry, wherein the determination to push is executed responsive to a determination that the receiving terminal is authorized to receive the new content.

9. The non-transitory computer readable storage medium according to claim 7, wherein the determination to push comprises causing display of the new content on the receiving terminal.

10. The non-transitory computer readable storage medium according to claim 7, wherein the apparatus is further caused to perform:
in response to the push indication, cause display of an indicator on the receiving terminal, wherein the indicator is displayed in association with the contact entry associated with the identifier of the publisher.

11. The non-transitory computer readable storage medium according to claim 7, wherein receiving the information corresponding to new content comprises determining to translate the information from a first format of the particular service to a second format for consumption at the receiving terminal and based on the receiving terminal.

12. The non-transitory computer readable storage medium according to claim 7, wherein the apparatus is further caused to perform:
determining the identifier associated with a new contact; and
determining to map the identifier to social services associated with the identifier.

13. An apparatus comprising a processor and memory including computer program code, the memory and the computer program code configured to, with the processor, cause the apparatus to:
receive information corresponding to new content associated with a particular service;
in response to receipt of the information corresponding to the new content, identify the particular service via a mapping registry that associates a plurality of respective services and identifiers of terminals associated with a publisher of the new content to the respective services, wherein the publisher is a user of the particular service and is represented as a stored contact entry;
retrieve an identifier of the publisher associated with the particular service based on the particular service identified via the mapping registry;
further in response to receipt of the information corresponding to the new content, identify at least one receiving terminal having a stored contact list comprising uniquely identified users and respective contact information, wherein the stored contact list comprises the identifier of the publisher; and
in response to identifying the at least one receiving terminal having the stored contact list comprising the identifier of the publisher, determine to push an indication of the new content to the at least one receiving terminal, wherein the indication of the new content is associated with a contact entry of the stored contact list and wherein the contact entry is associated with the identifier of the publisher.

14. An apparatus according to claim 13, wherein the apparatus is further caused to determine to store access restrictions regarding the new content from the mapping registry, and determine to push the indication responsive to a determination that the receiving terminal is authorized to receive the new content.

15. An apparatus according to claim 13, wherein the determination to push the indication comprises causing display of the new content on the receiving terminal.

16. An apparatus according to claim 13, wherein the indicator comprises one of:
an icon;
a symbolic flag; or
an altered feature associated with a contact corresponding to the identifier.

17. An apparatus according to claim 13, wherein the apparatus is further caused to determine to translate the information from a first format of the particular service to a second format for consumption at the receiving terminal and based on the receiving terminal.

18. An apparatus according to claim 13, wherein the apparatus is disposed at a network server.

19. An apparatus according to claim 13, wherein the apparatus is further caused to:
- determine the identifier associated with a new contact; and
- determine to map the identifier to social services associated with the identifier.

20. An apparatus according to claim 13, wherein the new content corresponds to dynamic data associated with a social service.

* * * * *